Aug. 19, 1969  M. A. LARSEN ET AL  3,461,574
EDUCATIONAL TOY

Filed July 10, 1967  7 Sheets-Sheet 1

INVENTORS
MARGET A. LARSEN
EARL SICKLER
BY Townsend and Townsend
ATTORNEYS

Aug. 19, 1969  M. A. LARSEN ET AL  3,461,574
EDUCATIONAL TOY

Filed July 10, 1967  7 Sheets-Sheet 2

INVENTORS
MARGET A. LARSEN
EARL SICKLER
BY Townsend and Townsend
ATTORNEYS

INVENTORS
MARGET A. LARSEN
EARL SICKLER
BY Townsend and Townsend
ATTORNEYS

United States Patent Office 3,461,574
Patented Aug. 19, 1969

3,461,574
EDUCATIONAL TOY
Marget A. Larsen and Earl E. Sickler, San Francisco, Calif., assignors to Intrinsics, Inc., San Francisco, Calif., a corporation of California
Filed July 10, 1967, Ser. No. 652,056
Int. Cl. A63h 33/08
U.S. Cl. 35—73                 15 Claims

ABSTRACT OF THE DISCLOSURE

An educational toy including a plurality of polyhedra, all of different size and configuration and all but the smallest formed of two telescopically interfitting members and including in descending order of size: a hexahedron, a cuboctahedron, a stellated rhombic dodecahedron, a rhombic dodecahedron, an interpenetrated hexahedron and octahedron, an octahedron, an icosahedron, a stellated dodecahedron, a dodecahedron, and a tetrahedron.

---

The present invention relates in general to polyhedra and, more particularly, to an assembly of polyhedra of different configuration and of selectively descending sizes for interfitting together.

Broadly stated, the present invention is directed to an educational toy made up of a plurality of polyhedra with each of the polyhedra of a configuration and dimension different from the configuration and dimension of every other polyhedron and so arranged in descending size such that each of the polyhedra except the smallest is dimensioned to contain the next smallest polyhedron in the series and each of the polyhedra except the largest is dimensioned to be contained within the next largest polyhedron in the series. All of the polyhedra except the smallest are formed of a plurality of telescopically interfiitting members for opening and closing the polyhedra to assemble it in the series.

The present invention provides a series of polyhedra for teaching the names and configurations of each of the polyhedra in the series and relating the correspondence between vertices, faces and edges both to clearly show the relationship between adjoining polyhedra in the series and teach Euler's theorem for polyhedra which states that for any simple polyhedron, the number of vertices V, less the number of edges E, plus the number of faces F is equal to two.

$$V - E + F = 2$$

In accordance with the present invention, a series of interfitting polyhedra is provided which includes a number or all of the polyhedra in the following associated order: hexahedron, cuboctahedron, stellated rhombic dodecahedron, rhombic dodecahedron, interpenetrated hexahedron and octahedron, octahedron, icosahedron, stellated dodecahedron, dodecahedron, and tetrahedron. It will be appreciated that the series provides a full range of different shaped and modified polyhedra including the five regular polyhedra, each of which is a polyhedron whose faces are congruent regular polygons and whose polyhedral angles are congruent and which are the tetrahedron, hexahedron, octahedron, dodecahedron, and icosahedron.

Also, the present invention clearly illustrates how polyhedra can be combined and transformed. Thus, the series in accordance with the preferred embodiment of the present invention includes both the hexahedron and octahedron as well as an interpenetration of the hexahedron and octahedron. Additionally, the series includes a dodecahedron and a rhombic dodecahedron as well as a stellated dodecahedron and a stellated rhombic dodecaheron.

In accordance with another aspect of the present invention, each of the polyhedra except the smallest in the series includes a pair of interfitting members with at least one member of the pair including at least two pair of intersecting walls with the lines of intersection of the two pair of walls parallel. Each wall of the two pair of walls of the one interfitting member lies within a plane parallel to a wall of the other of the interfitting members when the members are interfitted together and the two separate members of each of the polyhedra slidably fit together when the corresponding walls of the two members are positioned parallel and the two members are moved together in a direction along the aforementioned lines of intersection.

Since the interfitting members telescope rather than wedge together, this construction provides each of the polyhedra which is adapted and arranged to contain a smaller polyhedron with a maximum sized cavity therewithin to house the next smallest polyhedron. In this manner, the number of polyhedra in the series can be maximum while maintaining the variation in size between the smallest and the largest polyhedra within reasonable limits.

In accordance with still another aspect of the present invention, each polyhedron that is contained within the next larger polyhedron in the series has at least four corresponding vertices or sides. With this construction large air spaces do not occur in the region between the exterior wall surfaces of one polyhedron and the interior wall surfaces of the next larger polyhedron.

In accordance with another aspect of the present invention in all the polyhedra of the preferred series except the smallest and the stellated configurations, both members of the pair include the two pair of intersecting walls, and corresponding walls of the two members are closely spaced when the members are telescoped together. In the case of the stellated polyhedra, the intersecting walls on the one member include a wall portion of the shape of the base of the stellations, and when the members are nested, this wall portion on one member lies at the base of a stellation on the other member. This construction gives the student an appreciation for various shapes of stellated polyhedra and in particular for the shape of the stellation base. For example, stellations on the rhombic dodecahedron are four-sided pyramids with a rhombus forming the base and the stellations on the dodecahedron are five-sided pyramids with a pentagon forming the base.

In accordance with another aspect of the invention, all of the interfitting members form the polyhedra which make up the educational toy of this invention are formed from flat sheet members of the configurations shown in the drawing. With the flat-sheet members, the toy can be shipped and marketed in flat-sheet form providing a considerable saving in shipping and packaging costs. Additionally, when the assemblage of the flat-sheet members into the interfitting members of the respective polyhedra provides an educational experience to the user. This latter feature is especially applicable to those polyhedra which include stellations since the location of the stellations and the shape of the base of the stellations with respect to the remainder of the stellations is made apparent.

Other objects, features and advantages of the present invention will become apparent upon reading the following specification and referring to the accompanying drawings in which similar characteristics of reference represent corresponding parts in each of the several views.

Referring now to the drawing with particular reference to FIGURE 1, the various views of FIGURE 1 show the different polyhedra that make up the series of polyhedra utilized in the preferred embodiment of the present invention. The views illustrate the various polyhedra without reference to variations in size for nine of the polyhedra to be contained in a hexahedron in accordance with the preferred embodiment of the present invention. FIGURE 1A illustrates the cube or hexahedron 10 which is one of the regular polyhedra and includes six square faces which can be considered as four sides 11 and two ends 12 and eight vertices 13.

Figure 1A:
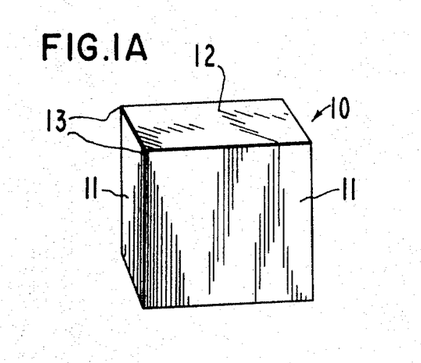
FIGS. 1A–J illustrate in order of descending size the polyhedra in the series of polyhedra utilized in the present invention.
Figure 1B:
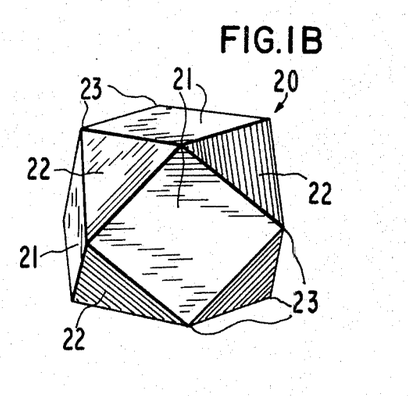

The cuboctahedron 20 is shown in FIGURE 1B and includes fourteen faces, six squares 21 and eight triangular 22, and twelve vertices 23.

Figure 1C:
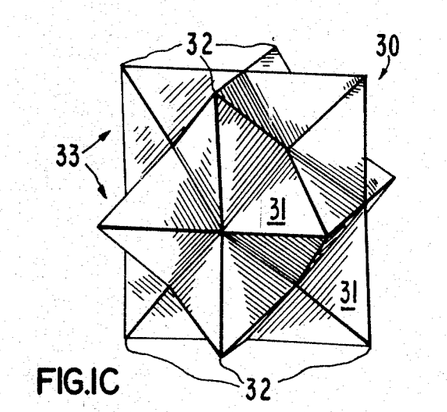

In FIGURE 1C is illustrated a stellated rhombic dodecahedron 30 having forty-eight triangular faces 31 and twenty-six vertices 32. This figure is a dodecahedron provided with a four-sided pyramid projecting outwardly from each rhombic face.

Figure 1D:
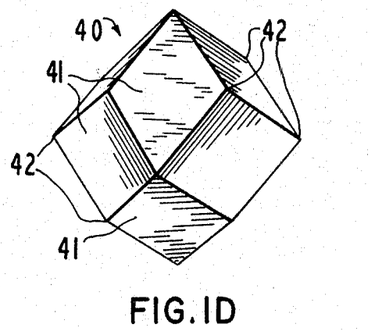

The rhombic dodecahedron 40 illustrated in FIGURE 1D, has twelve congruent faces 41, each in the shape of a rhombus, and fourteen vertices 42.

Figure 1E:
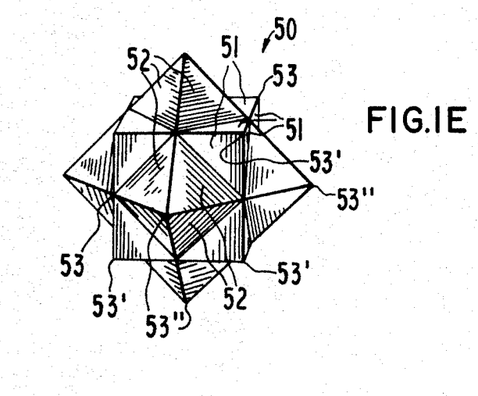

As shown in FIG. 1E, the interpenetrated hexahedron and octahedron 50 has forty-eight triangular faces and twenty-six vertices 53.

Three triangular faces 51 meet at each of the eight vertices 53′ of the hexahedron forming part of the polyhedron 50, and four triangular faces 52 meet at each of the six vertices 53″ of the octahedron making up the rest of the polyhedron 50.

Figure 1F:
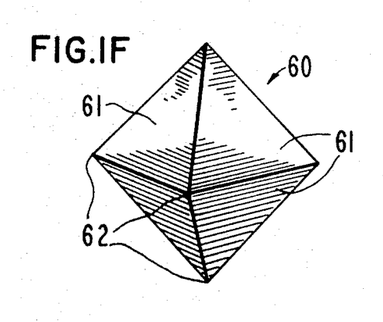

In FIG. 1F the illustrated octahedron 60, another of the regular polyhedra, includes eight triangular faces 61 and six vertices 62.

Figure 1G:
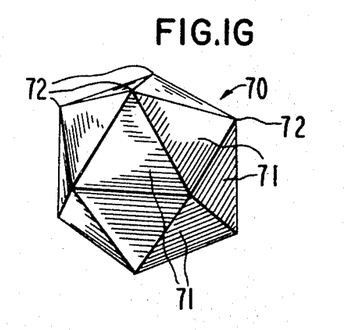

The icosahedron 70, also a regular polyhedra, is illustrated in FIG. 1G and includes twenty triangular faces 71 and twelve vertices 72.

Figure 1H:
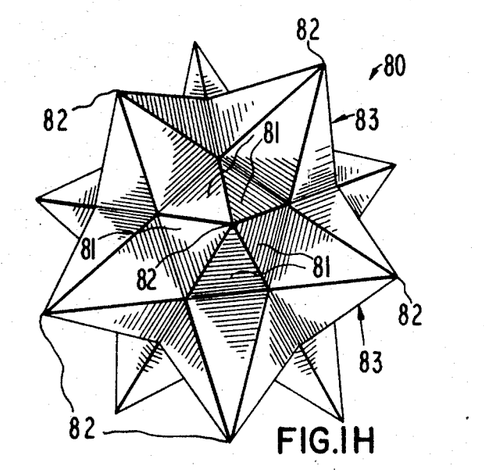

In FIG. 1H the stellated dodecahedron 80 illustrated has sixty triangular faces 81 and thirty-two vertices 82. This polyhedron is a transformation of the dodecahedron and a five-sided pyramid 83 with a pentagonal base projecting outwardly from each of the faces of the dodecahedron to a vertex 82.

Figure 1I:
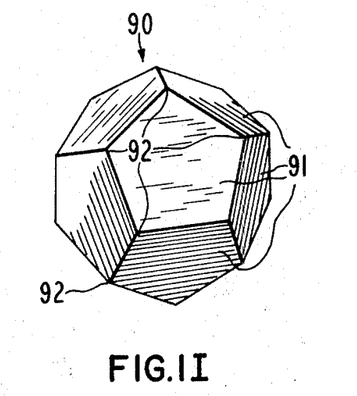

The dodecahedron 90, another of the regular polyhedra, is illustrated in FIG. 1I and includes twelve pentagonal faces 91 and twenty vertices 92.

Figure 1J:
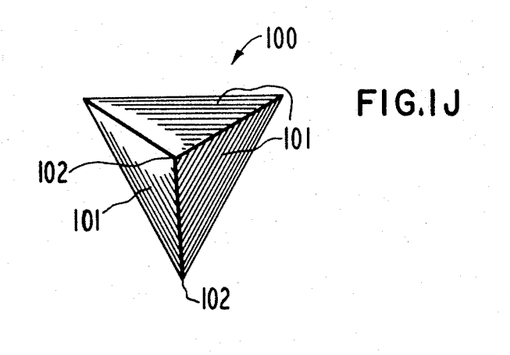

The tetrahedron 100, the last polyhedron of this series and again one of the regular polyhedra is illustrated in FIG. 1J, and this polyhedron 100 includes four faces 101 and four vertices 102.

Figure 2:
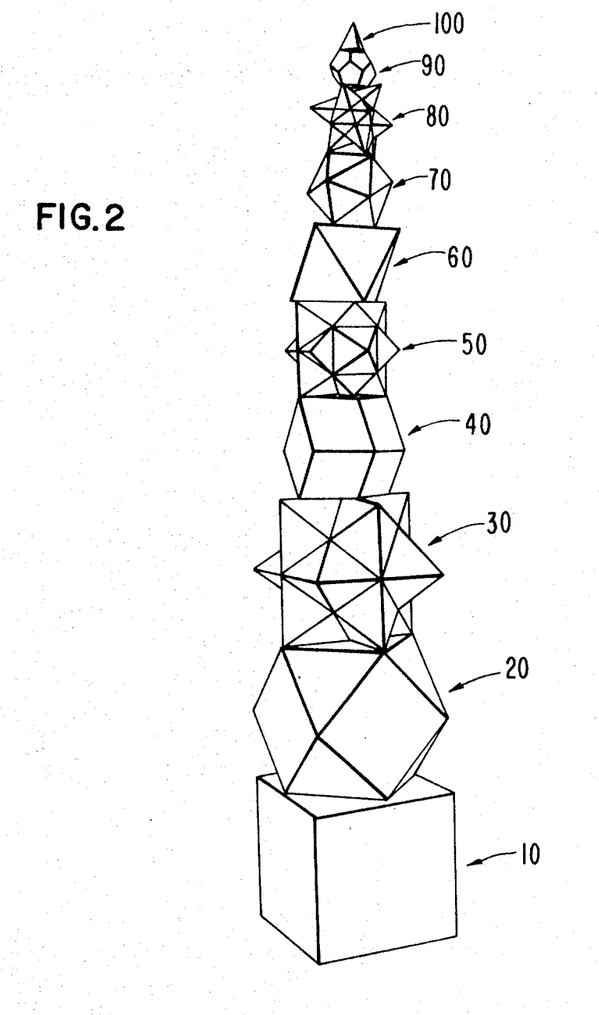
FIG. 2 is an elevational view of a stack containing the series of polyhedra in accordance with the preferred embodiment of the present invention.

A stack of the polyhedra in the series of the preferred embodiment of this invention and shown in FIGS. 1A–J is illustrated in FIG. 2 with the polyhedra dimensioned to nest together in the manner described below with reference to FIGS. 3A–J.

Nesting the various polyhedra that make up the educational toy, in accordance with the preferred embodiment of the present invention, is accomplished by having all of the polyhedra except the tetrahedron, the smallest of the series, formed of two interfitting members and adapted to closely receive the next smallest polyhedron of the series.

Referring now to FIGS. 3A–3I, there are illustrated the individual members of each of the polyhedra in the series of polyhedron in accordance with the present invention and the manner in which the separate members of each polyhedron fit together to enclose the next smallest polyhedron therewithin.

Figure 3A:
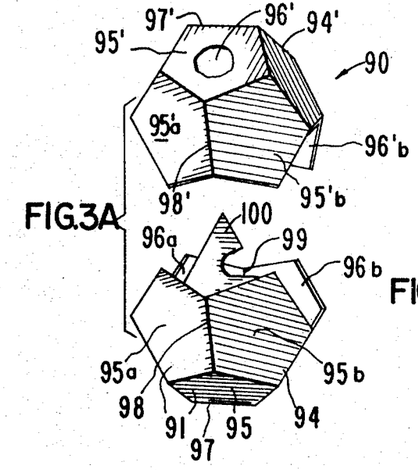
FIGS. 3A–I illustrate the manner in which the two interfitting members of each of the polyhedra of the series utilized in the present invention fit together with the next smallest polyhedron of the series positioned therewithin.

As shown in FIG. 3A, the tetrahedron 100 is a solid figure and the dodecahedron 90 is made up of two hollow, open ended, interfitting members 94 and 94′. These interfitting members 94 and 94′ are constructed similar to other larger polyhedra except for the stellated versions and include on each member 94 or 94′ two pair of intersecting walls with the lines of intersection of the two pairs parallel and the lines of intersection on one of the members arranged parallel to corresponding lines of intersection on the other of the members so that the two members can be telescopically nested together.

In the particular case of the dodecahedron, each of the two members 94 and 94′ are substantially identical except that member 94 is slightly smaller so as to fit inside member 94′. Member 94 includes eight faces with two of the pentagonal faces 94 and 96 completely surrounded by five of the other pentagonal faces 91. With this construction, the two surrounded faces 95 and 96 include a common edge and at the edges remote from that common edge 97 are located two pair of intersecting faces. These faces include faces 95a and 95b having edges in common with face 95 and intersecting in edge 98 and faces 96a and 96b having an edge in common with face 96 and intersecting in an edge 99 with edges 98 and 99 being parallel to one another. Member 94′ includes faces and edges corresponding to those of element 94 but designated with primed numbers.

Edges 98 and 98′ and 99 and 99′ are parallel when the two members 94 and 94′ are oriented for telescopic movement thereof with the result that member 94 is received within member 94′ such that the two members move together with these lines remaining parallel and, thus, with the faces 95a′, 95b′, 96a′ and 96b′ sliding into overlapping relationship with faces 95a, 95b, 96a and 96b, respectively.

In this construction, the members slide together in telescoping relationship as contrasted with wedging relationship whereby maximum use can be made of the space contained within the fitted together members 94 and 94′ making up the polyhedron 90 so as to contain therewithin a tetrahedron as large as possible. It will be appreciated that in nesting relationship the four vertices of the tetrahedron 100 each are located at one of the vertices of the dodecahedron.

Figure 3B:
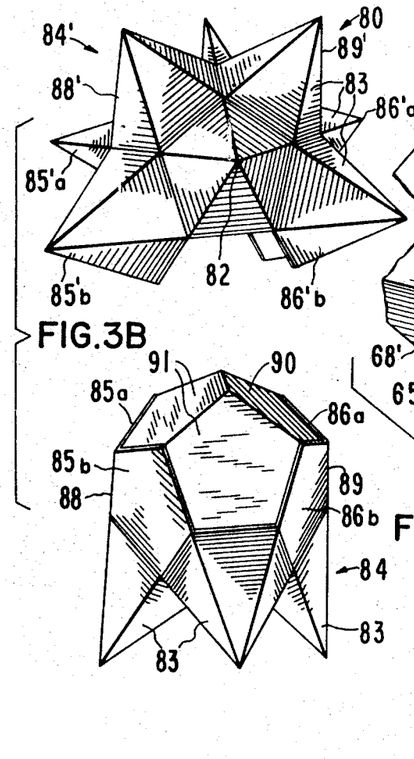

Referring now to FIG. 3B, there is shown the manner in which the dodecahedron 90 fits within the two hollow, open ended members 84 and 84′ making up the stellated dodecahedron. First of all, it will be realized that maximum use can be made of the space within the stellated dodecahedron 80 if the dodecahedron 90 is fitted therewithin with each of the faces 91 of the dodecahedron 90 positioned beneath a stellation of four sided pyramid 83 of the stellated dodecahedron 80.

The member 84 of the stellated dodecahedron 80 includes four closely grouped stellations 83 with pentagonal surface portions extending in pairs from opposite sides of the group of stellations 83. The pairs include a first pair of faces 85a and 85b which intersect in a line 88 and a second pair 86a and 86b intersecting in a line 89 on the opposite side of the member 84 with lines of intersection 88 and 89 arranged parallel to one another. The other member 84′ of stellated dodecahedron 80 includes the remaining eight stellations 83 grouped together with an opening to receive member 84. This member 84′ includes a group of four stellations similarly oriented to the stellations of member 84 with an additional four stellations 85a', 85b', 86a', and 86b', arranged in the locations corresponding to surface portions 85a, 85b, 86a and 86b, respectively, with the common edge 88' between stellations 85a' and 85b' and the common edge 89' between stellations 86a' and 86b' being parallel and respectively parallel to lines 88 and 89 when the two members 84 and 84' are telescopically nested together.

In this construction, the pentagonal portions 85a, 85b, 86a, 86b illustrate to the student the origin of the stellated dodecahedron.

Figures 3C, 3D:
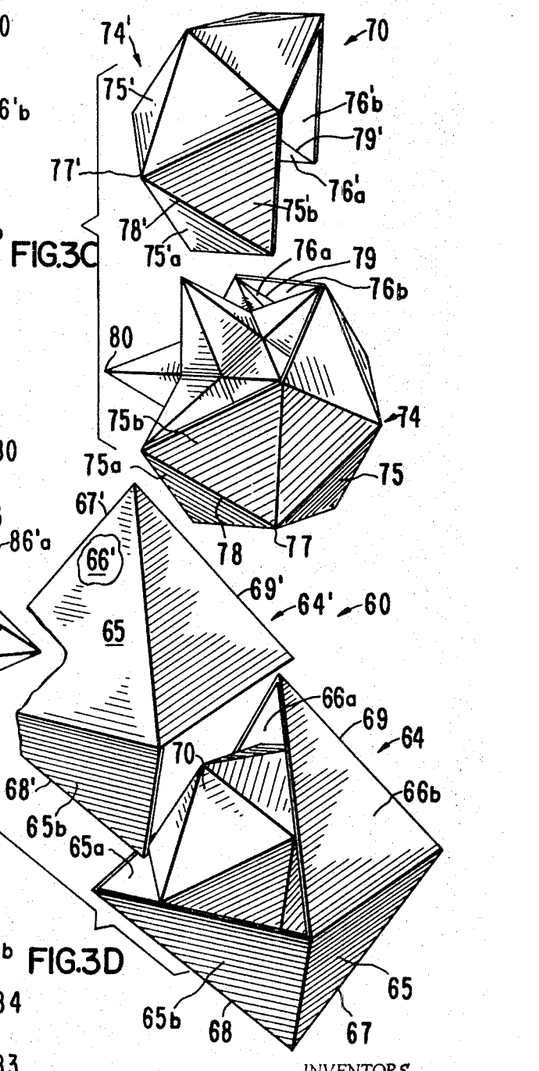

FIG. 3C illustrates how the stellated dodecahedron 80 is nested within and then contained within the icosahedron 70 with each of the twelve vertices of the stellations is nested within and then contained within the icosahedron when the two hollow, open ended, interfitting members 74 and 74' of the icosahedron are telescopically moved together to close the icosahedron. As in the case of other polyhedra described above, each of the members 74 and 74' includes two pair of intersecting faces with the lines of intersection parallel to one another and parallel to corresponding lines of intersection for two pairs of faces of the other member. Thus member 74 has twelve faces 71 with only two faces, one designated 75 and the other not shown having a common edge and completely surrounded on all sides and all vertices. At the vertex 77 of face 75 remote from the common edge with the other surrounded face are located two intersecting faces 75a and 75b having a common edge 78. On the opposite side of member 74 there is a similar pair of sides 76a and 76b intersecting an edge 79 which is parallel to edge 78.

In the icosthedron, the member 74' is complementary to member 74 and includes sides and edges which are designated with primed numbers and which are arranged parallel and closely spaced from the corresponding element of member 74 when the two members 74 and 74' are telescopically arranged together to form the closed icosahedron 70.

Referring now to FIG. 3D, there is illustrated the manner in which the icosahedron 70 is contained within the octahedron 60 which, as other polyhedra described above, includes two separate, hollow, open ended members 64 and 64', each having two pair of intersecting faces designated 65a and 65b and 66a and 66b for member 64 and similar faces designated with corresponding primed numbers on member 64'. To illustrate the location of faces 65a, 65b, 66a and 66b, the member 64 has six faces including one face 65 and another (not shown) which have a common edge 67 and are provided with faces along all of the edges thereof. At the vertex 62 at one end of the edge 67, the intersecting edge 68 of faces 65a and 65b meets edge 67. Similarly, at the other end of edge 67, the edge 69 which is the intersection of faces 66a and 66b meets edge 67. Edges 68 and 69 are arranged parallel to one another and these edges along with the faces 65a, 65b, 66a and 66b are arranged parallel to and closely spaced from corresponding edges and faces designated with prime numbers of member 64'. icosahedron located in the octahedron is positioned therewithin with eight of its sides in contact with the eight sides of the octahedron.

Figures 3E, 3F, 3G, 3H, 3I:
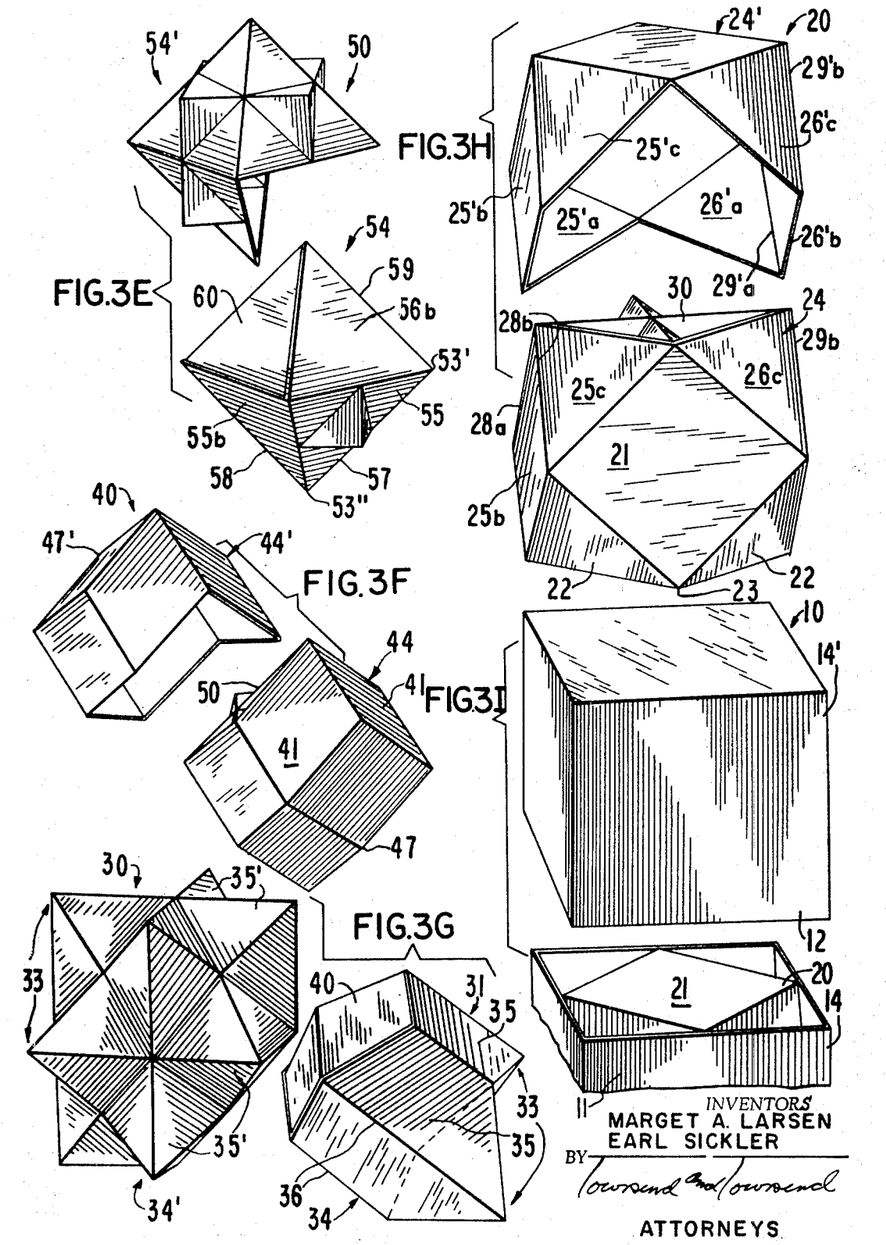

As shown in FIG. 3E, the octahedron 60 fits compactly into the octahedron portion of the interpenetrated hexahedron and octahedron 50. Here again in the case of the interpenetrated hexahedron and octahedron 50, the polyhedron is made up of two members 54 and 54' and which are configured substantially identically to the member 64 and 64' of the cuboctahedron but slightly larger to receive the cuboctahedron 60 therewith and with stellations positioned diagonally on the surfaces 55 and 56 of member 54 and on all of the surfaces of member 54'.

If the fourteen primary vertices of the interpenetrated polyhedron 50 are joined by twenty-four segments of straight lines of equal length, this polyhedron 50 is transformed into a rhombic dodecahedron. In this manner the polyhedron 50 can be slidably inserted and contained within a rhombic dodecahedron 40 as shown in FIG. 3F with one of the primary fourteen vertices of the polyhedron 50 located at each of the vertices of the rhombic dodecahedron 40.

Referring now to FIG. 3F, there is shown the polyhedron 50 positioned within the two hollow, open ended members 44 and 44' which make up the rhombic dodecahedron. Each of these members, which is identical to the other except for slightly different size, includes three rhombic faces at one end positioned around a common vertex 47 or 47' and then six rhombic faces 41, the intersecting edges of which are all aligned parallel and correspond to an adge of the opposing member of the rhombic dodecahedron. The two members 44 and 44' slidably nest together with the other six faces of one member parallel to and closely spaced from the other member of the pair 44 and 44'.

The rhombic dedecahedron 40 easily fits within the stellated rhombic dodecahedron 30 as illustrated in FIG. 3G since the stellated version 30 merely includes the provision of a pyramid with a quadrangular base projecting outwardly from each of twelve faces of a rhombic dodecahedron. Of the two hollow, open ended members 34 and 34', which slidably move together to make up the stellated rhombic dodecahedron 30, member 34 includes three closely spaced stellations 33 which project outwardly from a common vertex which would be the same common vertex 47 for three closely spaced rhombic faces of a rhombic dodecahedron. Extending from these three stellations 33 are six faces including rhombic face projections 35 when conform to six adjoining faces 41 of the rhombic dodecahedron member 40 contained therewithin and which have parallel intersecting edges 36. These rhombic face projections or portions 35 slidably fit within member 34' and are located therewithin each under a corresponding stellation 35'.

As illustrated in FIG. 3H, the stellated rhombic dodecahedron 30 can be positioned within a cuboctahedron 20 with each of the twelve primary vertices of the twelve stellations located at one of the twelve vertices of the cuboctahedron 20. As illustarted with two substantially identical, hollow, open ended members 24 and 24' slidably interfitting to form the cuboctahedron 20, one member 24 includes a bottom vertex 23 common to two square faces 21 and two triangular faces 22. The third edge of the triangular faces 22 is common with a square face 25b whose adjacent edges 28a and 28b are common with triangular faces 25a and 25c. On the opposite side of member 24 are a similar set of faces 26a, 26b, and 26c with two edges 29a and 29b common to two of the faces 26a, 26b and 26c and which are parallel to edges 28a and 28b. Member 24' includes corresponding faces and edges designated with prime numbers. Each of these corresponding edges and faces is positioned parallel to and closely spaced is its corresponding edge or face when the two members 24 and 24' are telescopically nested together.

The cubic nature of the cuboctahedron 20 can easily be slidably received within a cube or hexahedron 10 as illustrated in FIG. 3I. As shown there, member 14 of the hexahedron conforms to an open topped square box and member 14' conforms to an open bottomed square box dimensioned slightly larger than member 14 to slidably receive member 14. The cuboctahedron 20 is slidably inserted within the hexahedron 10 with the square faces 21 located parallel and adjacent to the faces 11 of the hexahedron but with the triangular faces 22 of the cuboctahedron oriented diagonally with respect to the square faces of the hexahedron 10.

Referring now to FIGS. 4A–J, there are shown plan views of the flat members that can be folded and secured together at specific locations to produce the corresponding parts that fit together in the manner shown in FIGURE 3 to produce the polyhedra shown in FIGS. 1A–1J.

Figures 4A, 4B, 4C, 4C, 4C, 4D, 4E, 4E, 4E:
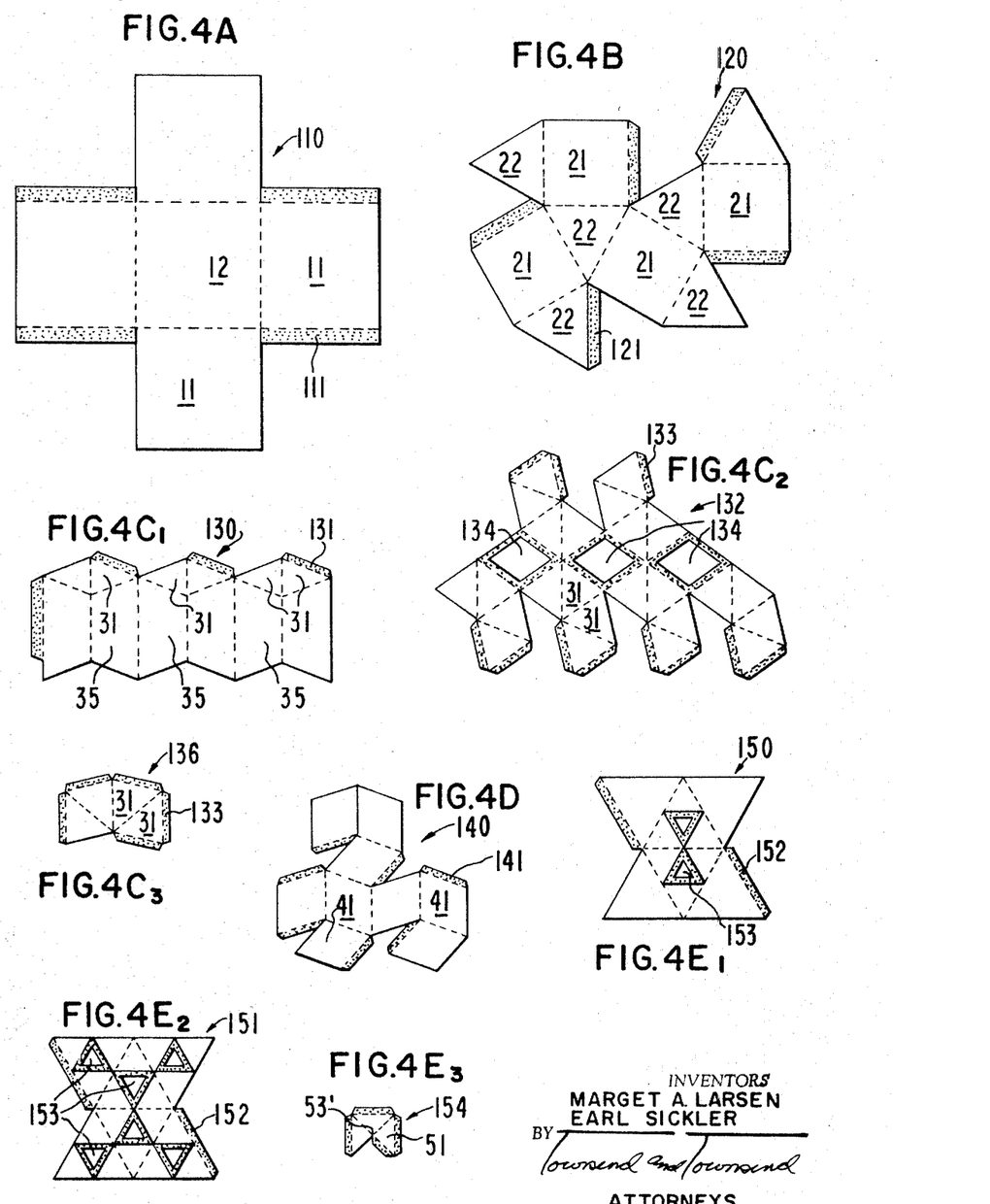
FIGS. 4A–J illustrated the flat-sheet members from which the interfitting members of the polyhedra shown in FIGS. 1–3 are formed.

With reference to FIG. 4A there is shown the inside member 110 made up of a square end 12 surrounded on its edges by square sides 11 which when folded together and joined by means of adhesive tabs 111 will form the inside open topped box 14 (see FIG. 31) to receive a slightly larger open bottomed box 14' which is formed from a templet of the same configuration as member 110.

In FIG. 4B, there is shown the templet 120 that when folded and secured together forms the two interfitting members 24 and 24' (see FIG. 3H) that make up the cuboctahedron 20.

Referring to FIG. $4C_1$, there is shown the templet 130 which when folded and secured together by adhesive tabs 131 will form the member 34 (see FIG. 3G) that makes up one part of the stellated rhombic dodecahedron 30 (see FIG. 1C). Templet 132 which makes up the other part 34' of the stellated rhombic dodecehedron is illustrated in FIG. $4C_2$ with adhesive tabs for areas 133. Templets 130 and 132 fold and are secured together to form the two interfitting members 34 and 34' with nine of the twelve stellations. The remaining three stellations which project from rhombic faces 134 on templet 132 are each formed from a templet 136 shown in FIG. $4C_3$ which are secured together and to rhombic faces 135 with adhesive tape 133.

Referring now to FIG. 4D, there is shown a templet 140 scored for folding and having tape strips 141 for securing portions of the folded templet together to form either of the two hollow open ended members 44 and 44' (see FIG. 3F) for forming the rhombic dodecahedron 40 (see FIG. 1D).

FIGS. $4E_1$, $4E_2$ and $4E_3$ illustrate templets for forming the interpenetrated hexahedron and octahedron 50 (see FIG. 1E). FIGS. $4E_1$ and $4E_2$ illustrate templets 150 and 151 having identical outlines and adhesive tab 152 for forming the two parts to an octahedron such as members 64 and 64' (see FIG. 3D) but provided with triangular areas 153 to receive a three-sided stellation formed from the templet 154 of FIG. $4E_3$ to produce the eight vertices 53' (see FIG. 1E) of the hexahedron. Thus, templet 150 includes two triangular areas 153 for receiving two stellations to produce the member 54 shown in FIG. 3E and templet 151 includes six such triangular areas 153 each for receiving a stellation made from templet 154 of FIG. $4E_3$ to produce member 54' shown in FIG. 3E.

Figure 4F:
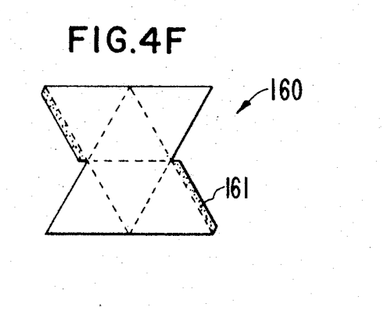

The octahedron 60 shown in FIG. 1F and formed of two members 64 and 64' as shown in FIG. 3D is formed by the templet 160 with adhesive tabs 161 shown in FIG. 4F. The outline of templet 160 is identical to that of templets 150 and 151 but is not provided with the adhesive lined areas 153 to provide the stellations representative of the penetrated corners of the hexahedron.

Figure 4G:
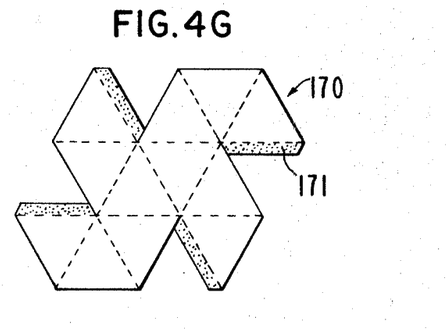
Figure 4H:
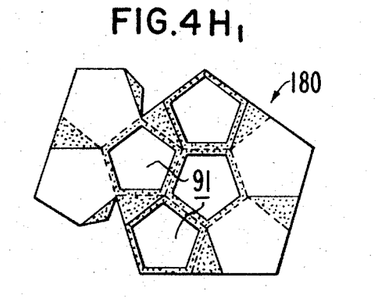
Figure 4H:
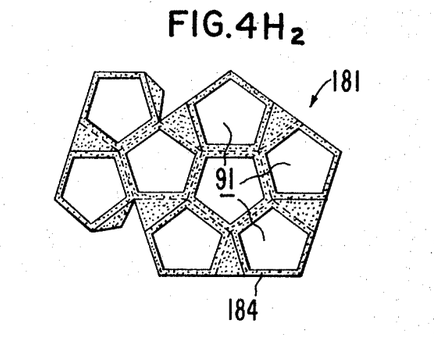
Figure 4H:
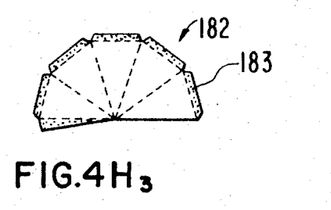

FIG. 4G shows a templet 170 provided with adhesive tabs 171 for folding together to form the two members 74 and 74' (see FIG. 3C) which telescope together to form the icosahedron 70 (see FIG. 1G).

FIGS. $4H_1$, $4H_2$ and $4H_3$, respectively, illustrate templets 180, 181 and 182 utilized to form the stellated dodecahedron 80 (see FIG. 1H). Templets 180 and 181 which respectively form the inner and outer members 84 and 84' of the stellated dodecahedron are identical in silhouette. However, templet 181 forming the outer member is provided with adhesive tabs 184 along the borders of all of its face panels 91 while templet 180 includes such adhesive strips 184 on only four of its face panels 91 to form the four closely grouped stellations 83 that appear on the inner member 84 as shown in FIG. 3B. The adhesive borders 184 are arranged to hold the five-sided stellations formed from templet 182 shown in FIG. $4H_3$.

Figure 4I:
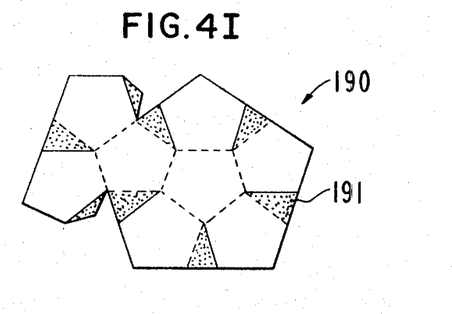

FIG. 4I shows a plan view of a templet 190 identical in silhouette to the templets 180 and 181 of FIGS. $4H_1$ and $4H_2$ and for forming the inner and outer members 94 and 94' making up the dodecahedron 90 (see FIG. 1I).

Figure 4J:
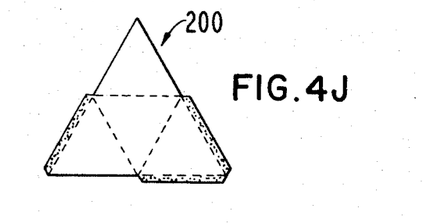

FIG. 4J discloses templet 200 in the shape of a triangle and scored internally of the triangle to divide it up into four smaller triangles and provided with adhesive tabs 201 for forming the tetrahedron 100 (see FIG. 1J).

It will be appreciated from the above that the embodiment of the present invention wherein the polyhedra are formed from flat templets not only provides for the educational understanding of polyhedra for the individual assembling the polyhedra but also provides a toy that requires sufficient degree of manual dexterity to assemble.

What is claimed is:

1. An educational toy comprising a plurality of polyhedra, each of said polyhedra of a configuration and dimension different from the configuration and dimension of every other polyhedron, each of the polyhedra except the smallest being dimensioned to contain the next smallest polyhedron and each of the polyhedra except the largest being dimensioned to be contained within the next largest polyhedron, at least all of the said polyhedra except the smallest thereof including a pair of interfitting members, at least one of said pair of members including at least two pair of intersecting walls with the lines of intersection of said two pair of intersecting walls being parallel, and each wall of the two pairs of walls of said one of said interfitting members lying within a plane parallel to a corresponding wall of the other of said interfitting members when said members are interfitted, said two separate members of each of said polyhedra slidably interfitting together when the corresponding walls of the two members are positioned parallel and the polyhedra moved together in the direction along said lines of intersection.

2. The toy of claim 1 characterized further in that for every polyhedron fitting within the next largest polyhedron there are at least four corresponding sides or vertices between the two polyhedra.

3. The educational toy of claim 1 characterized further in that said plurality of polyhedra includes in order of largest to smallest a hexahedron, a cuboctahedron, a stellated rhombic dodecahedron, a rhombic dodecahedron, an interpenetrated hexahedron and octahedron, an octahedron, an icosahedron, a stellated dodecahedron, a dodecahedron, and a tetrahedron.

4. The educational toy of claim 3 wherein said hexahedron, said cuboctahedron, said rhombic dodecahedron, said interpenetrated hexahedron and octahedron, said octahedron, said icosahedron, said dodecahedron, each are formed of a pair of interfitting members both of which include at least two pair of intersecting walls with the lines of intersection of said two pair of walls being parallel and each wall of the two pair of walls of one of said interfitting members lying within a plane parallel to and closely spaced from a corresponding wall of the other of said interfititng members when said members are telescopically interfitted.

5. The educational toy of claim 3 wherein said one member of the two members forming said stellated rhombic dodecahedron includes a rhombic wall portion on each wall of said two pair of walls, said rhombic wall portion lying at the base of one of the stellations of the other of said members when said two members are nested together.

6. The educational toy of claim 3 wherein said one member of the two members forming said stellated dodecahedron includes a pentagonal wall portion on each wall of said two pair of walls, said pentagonal wall portion lying at the base of one of the stellations of the other of said members when said two members are nested together.

7. An educational toy comprising a plurality of polyhedra including in order of decreasing size a hexahedron, a cuboctahedron, a stellated rhombic dodecahedron, rhombic dodecahedron interpenetrated hexahedron and octahedron, an octahedron, an icosahedron, a stellated dodecahedron, a dodecahedron, and a tetrahedron, each of said polyhedra except said tetrahedron comprising a pair of telescopically interfitting members.

8. An educational toy comprising a plurality of polyhedra, each of said polyhedra of a configuration and dimension different from the configuration and dimension of every other polyhedron, each of said polyhedra, except the smallest, being dimensioned to contain the next smallest polyhedra and each of the polyhedra, except the largest, being dimensioned to be contained within the next largest polyhedron, each of said polyhedra, except the smallest, including a pair of telescopically interfitting members.

9. The educational toy in accordance with claim 8 wherein said polyhedra include at least the five regular polyhedra.

10. The educational toy in accordance with claim 8 wherein said polyhedra include at least in the order of decreasing size a hexahedron, an octahedron, an icosahedron, a dodecahedron and a tetrahedron.

11. The educational toy in accordance with claim 8 wherein said polyhedra include a hexahedron, a cuboctahedron, a stellated rhombic dodecahedron, rhombic dodecahedron, interpenetrated hexahedron and octahedron, an octahedron, an icosahedron, a stellated dodecahedron, a dodecahedron, and a tetrahedron.

12. The educational toy of claim 8 characterized further in that at least one of said pair of members includes at least two pair of intersecting walls with lines of intersection of said two pair of intersecting walls being parallel and each wall of the two pair of walls of said one interfitting member lying within a plane parallel to a corresponding wall of the other interfitting member when said members are interfitted.

13. The educational toy of claim 8 characterized further in that for every polyhedron fitting within the next largest polyhedron there are at least four corresponding sides or vertices between the two polyhedra.

14. The educational toy of claim 8 wherein each of said interfitting members is formed from a flat sheet member having adhesive securing means positioned along at least two edges thereof.

15. The educational toy of claim 1 wherein each of said interfitting members is formed from a flat sheet member having adhesive securing means positioned along at least two edges thereof.

References Cited

Welch Scientific Co. Catalog, "Scientific Apparatus and Supplies," received in Patent Office Oct. 25, 1965.

LAWRENCE CHARLES, Primary Examiner

U.S. Cl. X.R

35—72; 46—1; 273—156